US012674538B2

(12) United States Patent
Ras et al.

(10) Patent No.: US 12,674,538 B2
(45) Date of Patent: Jul. 7, 2026

(54) DEVICE AND METHOD FOR REPAIRING PIPE WITH A REPAIR ASSEMBLY HAVING A LIGHTING ASSEMBLY

(71) Applicant: MORAY GROUP, LLC, Elk Grove Village, IL (US)

(72) Inventors: Chris Ras, Elk Grove Village, IL (US); Kevan Taylor, Clearwater, FL (US); Saran Kumar Boyilla, Ottawa, IL (US)

(73) Assignee: Perma-Liner Industries, LLC, Clearwater, FL (US)

( * ) Notice: Subject to any disclaimer, the term of this patent is extended or adjusted under 35 U.S.C. 154(b) by 666 days.

(21) Appl. No.: 17/571,912

(22) Filed: Jan. 10, 2022

(65) Prior Publication Data

US 2023/0220941 A1 Jul. 13, 2023

(51) Int. Cl.
| | |
|---|---|
| *F16L 55/165* | (2006.01) |
| *F16L 55/179* | (2006.01) |
| *F16L 55/18* | (2006.01) |
| *F16L 55/26* | (2006.01) |
| *E03F 3/06* | (2006.01) |

(52) U.S. Cl.
CPC ....... *F16L 55/1654* (2013.01); *F16L 55/1651* (2013.01); *F16L 55/1653* (2013.01); *F16L 55/179* (2013.01); *F16L 55/18* (2013.01); *F16L 55/265* (2013.01); *E03F 2003/065* (2013.01)

(58) Field of Classification Search
CPC ............. A61M 2025/1043; F16L 31/02; F16L 55/179; F16L 55/265; F21S 4/26
USPC ..................................... 166/117.5
See application file for complete search history.

(56) References Cited

U.S. PATENT DOCUMENTS

| | | | |
|---|---|---|---|
| 4,581,247 A | | 4/1986 | Wood |
| 4,680,066 A | | 7/1987 | Wood |
| 4,950,446 A | * | 8/1990 | Kinumoto ............... B29C 49/26 |
| | | | 264/269 |
| 5,925,409 A | * | 7/1999 | Nava ........................ B29C 63/34 |
| | | | 528/80 |
| 6,001,212 A | * | 12/1999 | Polivka ................. F16L 55/179 |
| | | | 264/269 |

(Continued)

FOREIGN PATENT DOCUMENTS

| | | | |
|---|---|---|---|
| DE | 102015200149 A1 | 7/2016 | |
| EP | 1262708 A1 * | 12/2002 | ................ C08J 5/24 |

(Continued)

OTHER PUBLICATIONS

Apr. 25, 2023 International Search Report and The Written Opinion— PCT/US2023/010297.

(Continued)

*Primary Examiner* — Kenneth Rinehart
*Assistant Examiner* — Richard K. Durden
(74) *Attorney, Agent, or Firm* — Nyemaster Goode, P.C.

(57) ABSTRACT

A method and apparatus for repairing a pipeline. The apparatus includes a liner assembly made of resin absorbent material. The liner assembly is configured to be impregnated with a light-activated resin. The apparatus also includes a bladder assembly configured to expand to press the main liner member against the interior wall of the pipeline and a lighting assembly configured to provide light at the wavelength which initiates curing of the light-activated resin.

24 Claims, 15 Drawing Sheets

(56) References Cited

U.S. PATENT DOCUMENTS

| | | | | |
|---|---|---|---|---|
| 6,089,320 | A * | 7/2000 | LaGrange | E21B 41/0042 |
| | | | | 166/50 |
| 6,217,194 | B1 * | 4/2001 | Huang | F21S 4/22 |
| | | | | 362/249.14 |
| 6,547,418 | B1 * | 4/2003 | Hsu | G09F 13/22 |
| | | | | 362/249.14 |
| 6,742,909 | B2 * | 6/2004 | Conti | D07B 1/148 |
| | | | | 362/108 |
| 7,845,372 | B2 | 12/2010 | Kiest | |
| 9,074,720 | B2 | 7/2015 | D'Hulster | |
| 9,188,289 | B2 | 11/2015 | Peil et al. | |
| 10,247,348 | B2 | 4/2019 | Meier | |
| 10,730,230 | B2 * | 8/2020 | Wind | B29C 35/0805 |
| 11,041,587 | B2 | 6/2021 | Liu et al. | |
| 2002/0191930 | A1 * | 12/2002 | Greer, IV | G02B 6/4482 |
| | | | | 385/128 |
| 2006/0254711 | A1 * | 11/2006 | Schwert | B29C 63/36 |
| | | | | 156/293 |
| 2007/0003648 | A1 * | 1/2007 | Weatherby | F16L 55/1653 |
| | | | | 425/11 |
| 2007/0131433 | A1 * | 6/2007 | Lynde | E21B 7/061 |
| | | | | 166/381 |
| 2007/0165404 | A1 * | 7/2007 | Cheng | A61C 19/004 |
| | | | | 362/253 |
| 2008/0160239 | A1 * | 7/2008 | Heuser | F16L 55/1656 |
| | | | | 428/36.1 |
| 2009/0056823 | A1 | 3/2009 | Kiest, Jr. | |
| 2010/0051168 | A1 * | 3/2010 | Moeskjaer | F16L 55/165 |
| | | | | 156/64 |
| 2012/0084956 | A1 | 4/2012 | Kiest, Jr. | |
| 2014/0036353 | A1 * | 2/2014 | Krogdahl | B29C 45/1657 |
| | | | | 359/350 |
| 2015/0192237 | A1 | 7/2015 | Kiest, Jr. et al. | |
| 2016/0241006 | A1 * | 8/2016 | Tannahill | B63B 45/02 |
| 2016/0273698 | A1 * | 9/2016 | Kiest, Jr. | B29C 33/10 |
| 2017/0082251 | A1 * | 3/2017 | Tannahill | F21S 4/22 |
| 2017/0343147 | A1 * | 11/2017 | Meier | F16L 55/1654 |
| 2018/0229404 | A1 | 8/2018 | Starr et al. | |
| 2018/0229424 | A1 * | 8/2018 | Bichler | F16L 55/18 |
| 2018/0281241 | A1 * | 10/2018 | Schropp | F16L 55/26 |
| 2019/0293248 | A1 * | 9/2019 | Tannahill | H02S 30/20 |
| 2020/0182391 | A1 | 6/2020 | Kennard et al. | |
| 2020/0300403 | A1 | 9/2020 | Taylor | |
| 2024/0240742 | A1 * | 7/2024 | Larsson | B29C 35/0805 |

FOREIGN PATENT DOCUMENTS

| | | |
|---|---|---|
| EP | 2151617 | 2/2010 |
| EP | 3795880 A1 * | 3/2021 |

OTHER PUBLICATIONS

Cosmic Engineering website (http://www.cosmic.at/englisch/cosmic-csh100-uvledausruestung.html#1397tab2) disclosing UV-LED pipe lining equipment for main/lateral pipe junction repair (the "Cosmic Website").

* cited by examiner

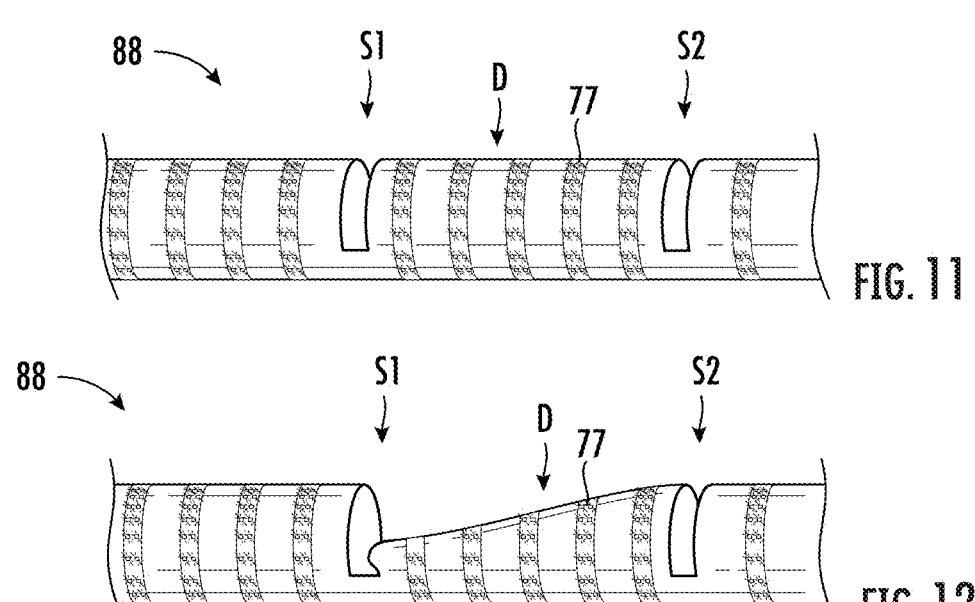
FIG. 11
FIG. 12
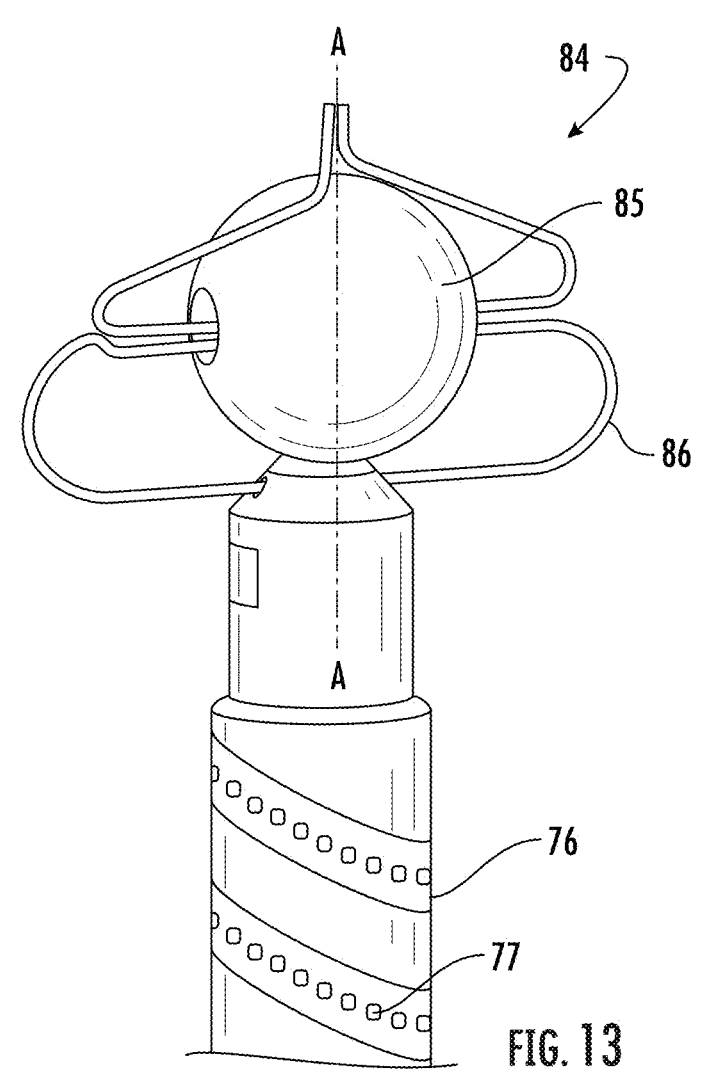
FIG. 13

DEVICE AND METHOD FOR REPAIRING PIPE WITH A REPAIR ASSEMBLY HAVING A LIGHTING ASSEMBLY

BACKGROUND

The present invention relates to a device and method for repairing pipe, such as underground sewer pipe and the like.

Prior methods for repairing damaged pipelines include moving a liner tube impregnated with a liquid material capable of curing and hardening to the position within the pipe where the damaged portion is located. The liner tube is urged in an outward radial direction into contact with the pipeline being repaired and the liquid material impregnating the liner tube is permitted to cure and harden. The liner tube forms an interior liner in the pipe for the pipeline being repaired.

On some occasions lateral pipelines are connected to main pipelines. Often damage occurs at the junction between the lateral pipeline and the main pipeline. T-shaped or Y-shaped liner tubes have been utilized to fit within the junction between the lateral pipeline and the main pipeline. Liner tubes form a T-shaped or Y-shaped liner after hardening to the interior of the junction between the lateral pipeline and the main pipeline.

A method used for repairing pipelines and other structures includes the use of a liner tube having a felt layer on its inside and having a protective layer made of polymer or other plastic material on its outside. The liner tube is vacuum-impregnated with a resin mix in what is commonly referred to as a "wet-out" process. Just prior to wetting-out the liner, a catalyst is mixed with the resin so as to activate the resin and cause it to begin curing and hardening. The resin impregnated liner tube is then inverted into the pipeline so that the felt layer is inverted from the inside of the tube to the outside. Once the resin cures and hardens, the liner provides a new lining for the pipeline. Some resins are set to cure at ambient temperatures.

One problem with this method is that the catalyst must be mixed with the resin before the liner tube is wet-out and before positioning the liner tube at the damaged section of pipe. Once the catalyst is applied to the resin, the resin begins curing and time is of the essence in order to have the liner tube in place within the pipeline to be repaired. If the resin hardens before the liner tube is properly positioned within the pipe, it may require that a portion of the existing pipeline be dug up and replaced. If, on the other hand, a resin mix with a longer cure time is used to ensure adequate working time to install the liner, productivity suffers as the crew waits for the liner to cure and harden.

Aside from the loss in productivity, there are also additional costs involved in retarding or accelerating the cure time. For example, following the wet-out process the lining tube can be packed in ice and stored in a refrigerated compartment of the truck to retard or prevent the resin from curing. The lining tube may be warmed up after arriving at the job site to help accelerate the cure time, which requires a large boiler and other equipment. Such equipment and the associated labor required all add to the total installation cost.

In recent years the industry has begun impregnating the liner with light-activated resin, then shining ultra violet (UV) light toward the liner to begin the curing process after the liner is placed within the pipe system. Light-activated resins help overcome certain drawbacks in other types of resins because the resin in the impregnated liner does not begin to cure until it is exposed to UV light. Prior methods using light-activated resin have had problems lining and effectively curing long lengths of pipe. Retrieving the light train from the pipe after curing has sometimes damaged the light train due to the strain placed on the relatively fragile lighting components during retrieval. Further, providing enough power to effectively cure the light-activated resin over long distances has been difficult.

Prior light-activated resin methods have also not been able to efficiently cure a main/lateral junction using UV light. Further, prior methods have not been able to cure a main/lateral junction while also using UV light to cure the lateral liner, especially if the lateral liner is relatively long or if the lateral pipe is Y-shaped or otherwise has bends or curves. For example, some prior methods shine a light from the launcher device positioned in the main pipe into the lateral pipe in order to cure the lateral liner. Shining a light from the main pipe into the lateral pipe has several drawbacks. To initiate the cure, the light requires a relatively high amount of power and it is difficult to aim the light in the most efficient direction toward the lateral liner. Further, even a well-positioned bright light is not able to cure light-activated resin very far into the lateral, and it is not able to shine light around bends or corners in the lateral pipe.

Therefore, there is a need for an improved method and apparatus for repairing pipes which overcomes these and other problems in the art.

SUMMARY

According to one aspect of the present invention, an apparatus is provided for repairing the juncture between a main pipeline and a second or lateral pipeline. The apparatus includes a liner assembly having a main liner member and a lateral liner tube made of resin absorbent material. The liner assembly is configured to be impregnated with a resin having one or more light-activated initiators embodied therein. The apparatus also includes a bladder assembly having a main bladder tube and a lateral bladder tube. The bladder assembly is made from a light-permeable material which allows one or more wavelengths of light to pass through. The apparatus further includes a lighting assembly having a main light pack and a lateral light train. The main light pack is configured to be positioned in the main pipe to help cure the main liner member and the lateral light train is configured to be positioned in the lateral pipe to help cure the lateral liner tube. In some embodiments one end of the lateral light train is directly or indirectly combined with the closed/leading end of the lateral bladder tube so that inversion of the lateral bladder tube pulls the lateral light train into the lateral pipe. In some embodiments the liner assembly, bladder assembly, and lighting assembly are combined with a launcher device which helps position the assemblies inside the underground pipe system. In some embodiments the main light pack is positioned around the launcher device with the main bladder tube radially outward from the main light pack and the main liner member radially outward from the main bladder tube such that the main liner member is between the main bladder tube and the inside wall of the main pipe. In other embodiments the main light pack is positioned within the main bladder tube or positioned radially outward from the main bladder tube. The apparatus can be used in applications where the lateral liner is inverted into the lateral pipeline or in so-called "pull-in-place" applications.

According to another aspect of the present invention, an apparatus is provided for repairing the juncture between a main pipeline and a second or lateral pipeline which obviates the need for the lateral bladder tube. The apparatus includes a liner assembly having a main liner member and a lateral liner tube made of resin absorbent material. The lateral liner tube has an impermeable layer to prevent air or other fluid from passing through during inversion. The lateral liner tube is made from a light-permeable material which allows one or more wavelengths of light to pass through. One end of the lateral liner is frangibly combined with an extension tube. The liner assembly is configured to be impregnated with a resin having one or more light-activated initiators embodied therein. The apparatus further includes a lighting assembly having a main light pack and a lateral light train. The main light pack is configured to be positioned in the main pipe to help cure the main liner member and the lateral light train is configured to be positioned in the lateral pipe to help cure the lateral liner tube. In some embodiments one end of the lateral light train is attached to the extension tube so that inversion of the lateral liner tube pulls the lateral light train into the lateral pipe. Retrieving or pulling on the lateral light train after the liner has cured and hardened separates the extension tube from the lateral liner tube at the frangible connection leaving only the cured liner assembly in the pipes. In some embodiments the liner assembly and lighting assembly are combined with a launcher device which helps position the assemblies inside the underground pipe system. In some embodiments the main light pack is positioned around the launcher device with the main liner member radially outward from the main light pack such that the main liner member is between the main light pack and the inside wall of the main pipe. In other embodiments the main light pack is positioned within the main bladder tube or positioned radially outward from the main bladder tube.

Another aspect of the present invention includes a method of using the apparatus described in the above embodiments for repairing the juncture between a main pipeline and a second or lateral pipeline. The method includes positioning a repair assembly at the junction of the main pipeline and the lateral pipeline. The repair assembly includes a liner assembly having a main liner member and a lateral liner tube, a lighting assembly having a main light pack and a lateral light train, and a bladder assembly having a main bladder tube. In some embodiments the bladder assembly further includes a lateral bladder tube. The main light pack is positioned around the repair assembly and an end of the lateral light train is attached to the closed extension tube or lateral bladder, depending on the particular embodiment. After being positioned, a fluid such as air is used to inflate the liner assembly and bladder assembly to urge the main liner member against the interior wall of the first pipe. The inflation also causes the lateral components to invert from a first position where they are positioned within the launcher device to a second position where they extend upward into the lateral pipe. Inversion of the lateral liner (and bladder in some embodiments) pulls the leading end of the lateral light train into the lateral pipe. Power is provided from a power source to illuminate the main light pack and the lateral light train to help cure the resin impregnated liners. After the liner assembly has cured and hardened, the launcher device, bladder assembly, and lighting assembly are removed from the pipes. In some embodiments the lateral light train is used to retrieve or pull the extension tube or lateral bladder out of the lateral pipe.

Another aspect of the invention includes an apparatus and method for repairing a length of pipe which obviates the need for a bladder tube. The apparatus includes a liner assembly having a liner tube made of resin absorbent material. The liner tube has an impermeable layer to prevent air or other fluid from passing through during inversion. The lateral liner tube is made from a light-permeable material which allows one or more wavelengths of light to pass through. The liner tube is impregnated with a curable resin having one or more light-activated initiators embodied therein then inverted into the pipe. One end of the liner tube is frangibly combined with an extension tube. The liner assembly is configured to be impregnated with a resin having one or more light-activated initiators embodied therein. The apparatus further includes a lighting assembly having a light train. One end of the light train is attached to the extension tube so that inversion of the liner tube pulls the light train into the pipe. Retrieving or pulling on the light train after the liner has cured and hardened separates the extension tube from the liner tube at the frangible connection leaving only the cured liner assembly in the pipe.

Another aspect of the invention includes an apparatus and method for repairing a length of pipe sometimes referred to as a spot repair. The apparatus includes a repair assembly having a liner member, a light pack, and a bladder tube. In some embodiments the liner member, bladder tube, and lighting pack are combined with a launcher device which helps position the components inside the underground pipe system. In some embodiments the light pack is positioned around the launcher device with the bladder tube radially outward from the light pack and the liner member radially outward from the bladder tube such that the liner member is between the bladder tube and the inside wall of the pipe. In other embodiments the main light pack is positioned within the main bladder tube or positioned radially outward from the main bladder tube. The liner member is impregnated with a curable resin having one or more light-activated initiators embodied therein. The launcher device is positioned in a pipe adjacent to a damaged portion needing repair. Fluid pressure (such as air pressure) is introduced to inflate the bladder tube and urge the liner member into contact with the interior walls of the pipeline. The light pack is illuminated to cure the resin. After the liner member cures and hardens the bladder tube is deflated and removed with the launcher device.

BRIEF DESCRIPTION OF THE DRAWINGS

FIG. 11 is a perspective view of the main light pack in a first position.

FIG. 12 is a perspective view of the main light pack in a second or deformed position.

FIG. 13 is a perspective view of a guide member.

DETAILED DESCRIPTION

Figure 1:
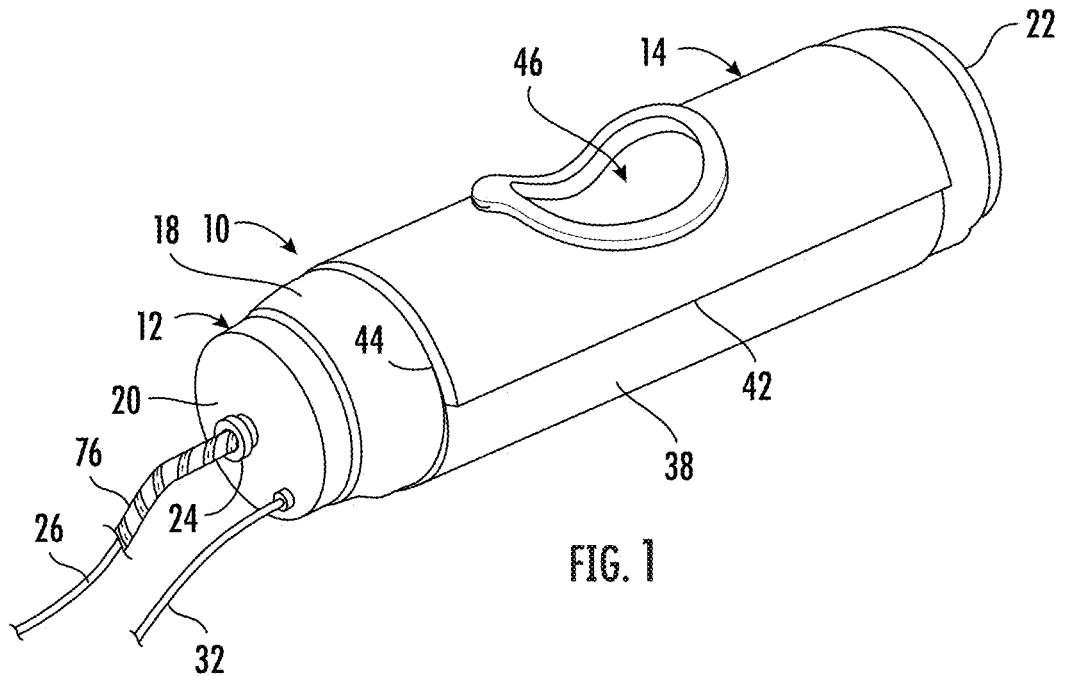
FIG. 1 is a perspective view of an embodiment of the invention.
Figures 2, 3:
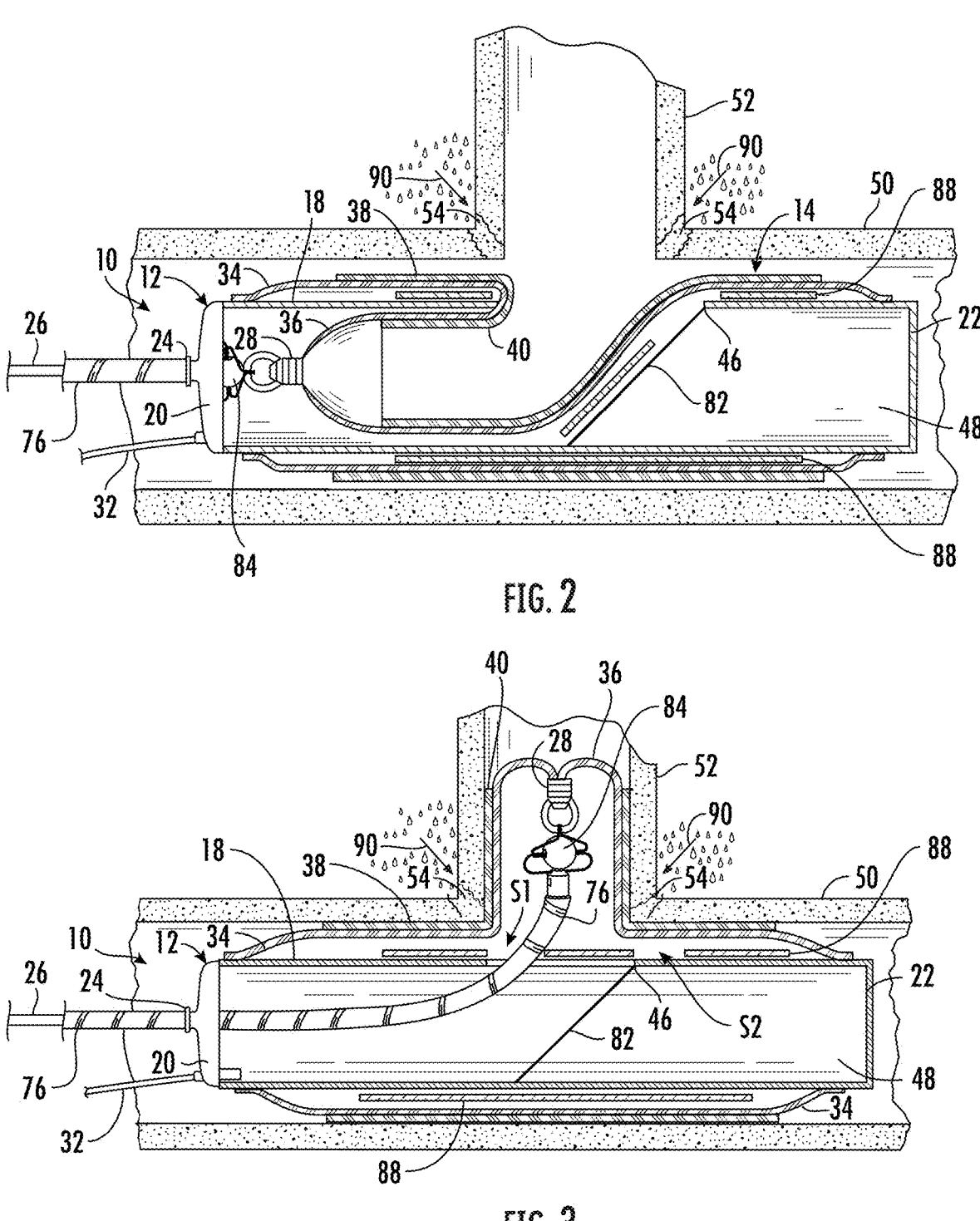
FIG. 2 is a section view of an embodiment of the invention positioned in a pipe system before inversion.
FIG. 3 is a section view of an embodiment of the invention positioned in a pipe system after inversion.

Referring to FIGS. 1-3, a repair assembly is generally designated by the numeral 10. Repair assembly 10 includes a launcher device 12 having mounted thereto a liner assembly 14 having a main liner member 38 and a lateral liner tube 40. Repair assembly 10 also includes a lighting assembly 87 having a main light pack 88 and a lateral light train 76. The main light pack 88 is configured to be positioned in the main pipe 50 to help cure the main liner member 38 and the lateral light train 76 is configured to be positioned in the lateral pipe 52 to help cure the lateral liner tube 40. In the embodiments shown in FIGS. 1-3, the repair assembly 10 also includes a bladder assembly having a main bladder tube 34 and a lateral bladder tube 36. In the embodiment shown, the bladder assembly is fitted on the interior of the liner assembly 14 and the main light pack 88 is positioned around the launcher device 12 on the interior of the bladder assembly. In some embodiments the main light pack 88 is combined with the launcher device 12 by elastic or rubber bands so the main light pack 88 is secured to the launcher device 12 during use and is also easily removable from the launcher device 12 for replacement or storage. In some embodiments the main light pack 88 is made of a flexible or elastic material so that it stretches and expands between a first position having a first diameter and a second position having second diameter. The ability to stretch and expand helps in embodiments where the main light pack 88 is positioned within (as part of) the bladder assembly or where the main light pack 88 is positioned around (radially outward from) the bladder assembly.

The bladder assembly is made from a light-permeable material which allows one or more wavelengths of light to pass through. The bladder assembly material need not be translucent or transparent as long as the wavelength(s) of light which triggers the light-activated initiator is allowed to pass through. In some embodiments the bladder material allows a first wavelength such as UV to pass through but prevents a second wavelength such as visible light from passing through. Selectively allowing only certain wavelengths of light to pass through the bladder assembly helps ensure curing is only initiated at the proper time. In the particular configuration shown in FIGS. 1-3, the liner assembly 14 and bladder assembly are T-shaped, but they can also be Y-shaped to accommodate a lateral pipeline that intersects with a main pipeline at an oblique angle.

Launcher device 12 includes side walls 18, an end cap 20 at a first end and an end wall 22 at a second end, all of which form a launcher device cavity 48. End cap 20 includes a line inlet 24 through which the lateral light train 76 and/or conducting member 26 extends. The lateral light train 76 may be directly attached to a closed bladder tube end 28 or indirectly attached to the closed bladder tube end 28 through a d-ring, guide member 84, or other connecting means, as explained below in more detail.

As can be seen in FIGS. 1-3, the main liner member 38 is comprised of what is initially a flat sheet of material wrapped around the outside of the main bladder tube 34 and the launcher device 12. The main liner member 38 includes overlapping edges 42, 44. The launcher device 12 includes a launcher device opening 46, and the lateral liner tube 40 is contained within the launcher device cavity 48. Similarly, the lateral bladder tube 36 is contained within the launcher device cavity 48 and surrounds the lateral liner tube 40. Both the main liner member 38 and the lateral liner tube 40 are comprised of a felt layer, which is the lining surface that contacts the interior surface of the host pipe, and a polymer coating is on the opposite surface. The felt layer of the liners 38, 40 is configured to be impregnated with a curable resin having one or more light-activated initiators embodied therein. The one or more light-activated initiators are set to begin curing the resin upon exposure to one or more predetermined wavelengths of light. The one or more wavelengths could be ultra-violate (UV), infrared (IR), violet or blue light (near the end of the visible spectrum), or any other suitable wavelength. Having multiple light-activated initiators (e.g., a first light-activated initiator and a second light-activated initiator) in the resin may improve the curing process in certain situations. For example, some wavelengths of light are better at penetrating through the bladder assembly while other wavelengths of light (such as blue light) are better at penetrating more deeply into the felt layer of the liners 38, 40. Thus, different wavelengths of light can be used to target light-activated initiators in different parts of the impregnated liners 38, 40. The lighting assembly 87 is configured to provide light at the same wavelength(s) that trigger(s) the light-activated initiator to begin curing so exposure of the resin to the light from the lighting assembly 87 initiates curing.

FIGS. 2 and 3 show the repair assembly 10 after the launcher device 12 has been positioned within the pipe system. FIG. 2 shows the repair assembly 10 within a main pipeline 50 which is connected to a lateral pipeline 52. The damaged portion 54 is shown needing repair. Ground water 90 from outside the lateral pipeline 52 and the main pipeline 50 will seep through the damaged portion 54 and enter the interior of the main pipeline 50 and the lateral pipeline 52. FIG. 2 shows the repair assembly 10 moved within the main pipeline 50 adjacent the lateral pipeline 52. The launcher device opening 46 is registered with a junction between a lateral pipeline 52 and the main pipeline 50. This alignment may be done with a camera (not shown). The lateral bladder tube 36 and the lateral liner tube 40 are contained within the launcher device cavity 48. The lateral light train 76 may be positioned within the launcher device cavity 48 or it may extend out of the end of the launcher device through inlet 24.

Fluid pressure (such as air pressure) is introduced in the launcher device cavity 48 through air hose 32, which inflates the bladder assembly and urges the main liner member 38 into contact with the interior walls of the main pipeline 50 and the lateral liner tube 40 into contact with the interior walls of the lateral pipeline 52. In the embodiment shown, during inversion the main light pack 88 remains relatively stationary since it is combined with the launcher device 12 radially inward from the main bladder tube 34. However, in other embodiments the main light pack 88 is part of or positioned outward from the bladder tube 34 and expands with the expanding bladder tube 34. Continued air pressure causes the lateral bladder tube 36, the lateral liner tube 40, and the lateral light train 76 to invert outwardly through the launcher device opening 46 into the lateral pipeline 52 from a first position shown in FIG. 2 to a second position shown in FIG. 3. The launcher device 12 may include a ramp 82 to help direct the lateral bladder tube 36, lateral liner tube 40, and lateral light train 76 toward the lateral pipeline 52. Inversion of the lateral bladder tube 36 pulls the lateral light train 76 into the lateral pipeline 52 where the lights 77 are illuminated to initiate and cure the lateral liner tube 40. While air is the preferred pressurized material, other gasses or fluids may be used. It should be noted that this inversion process causes the lateral liner tube 40 to be placed on the outside of the bladder tube 36 once the inversion is complete, as shown in FIG. 3. Pressure within launcher device cavity 48 is maintained until the resin cures and hardens. This results in the liner assembly 14 assuming a rigid configuration, forming a lining to the lateral pipeline 52 and the main pipeline 50. The bladder assembly may be deflated and removed from the pipe system along with the lighting assembly 87 and launcher device 12. In some embodiments the lateral bladder tube 36 is removed from the lateral pipeline 52 by pulling on the lateral light train 76, as described below in more detail. The lighting assembly 87 may be used in subsequent lining operations.

While the preferred embodiment of the invention is intended for use with an inversion-type application wherein the lateral bladder tube 36 and the lateral liner tube 40 invert outwardly into the lateral pipeline 52, those skilled in the art will appreciate that pull-in-place applications may also be used.

Figure 4:
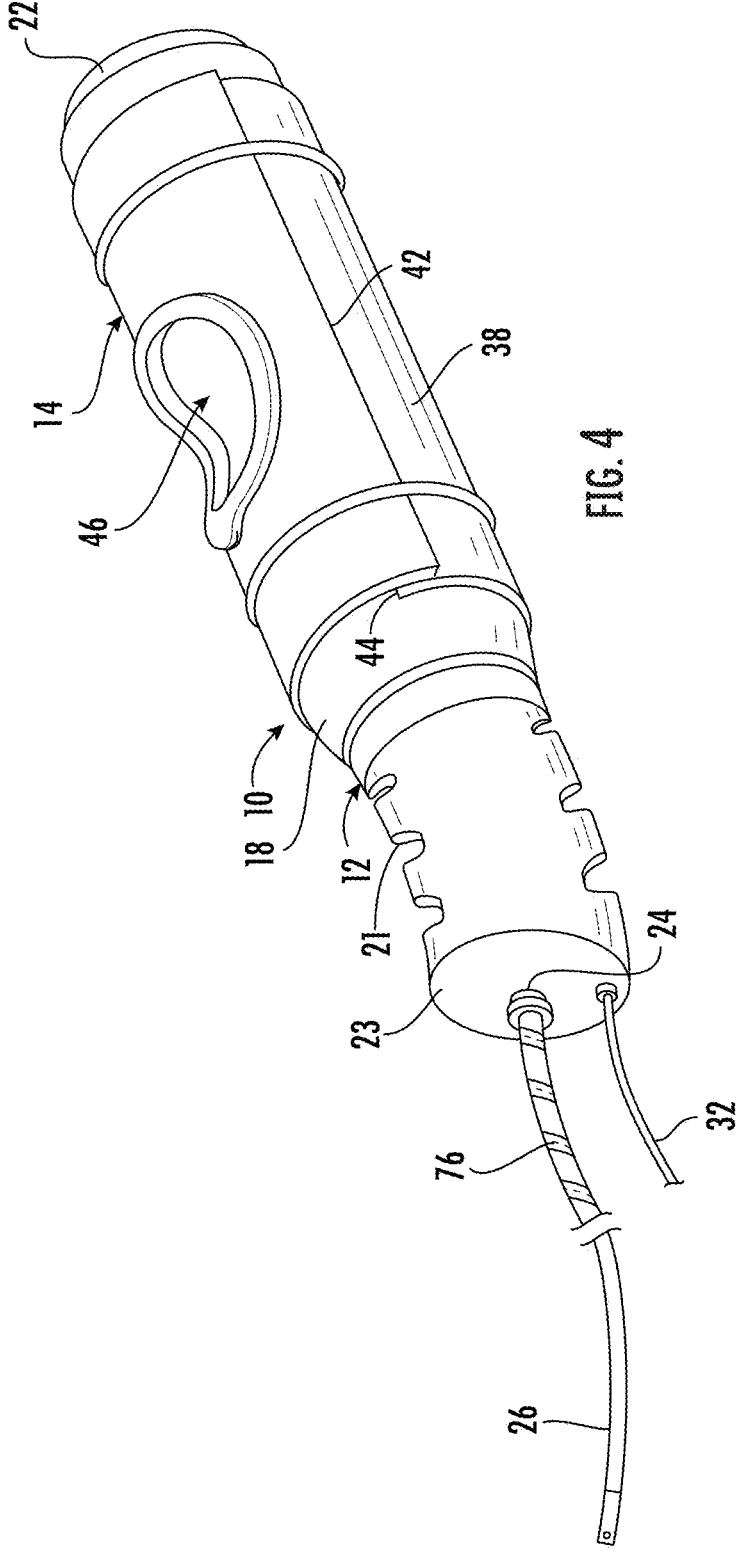
FIG. 4 is a perspective view of an embodiment of the invention.
Figure 5:
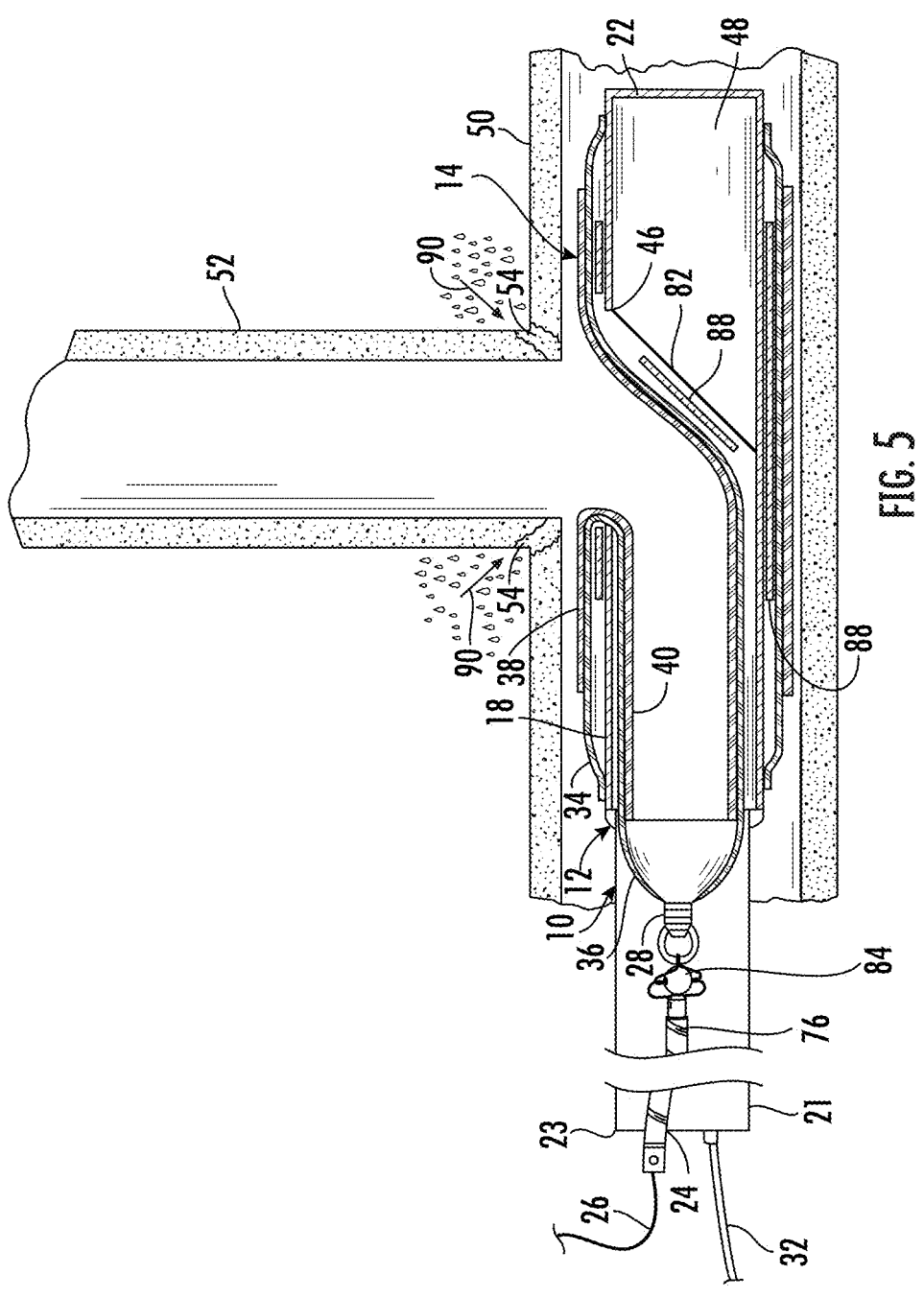
FIG. 5 is a section view of an embodiment of the invention positioned in a pipe system before inversion.
Figure 6:
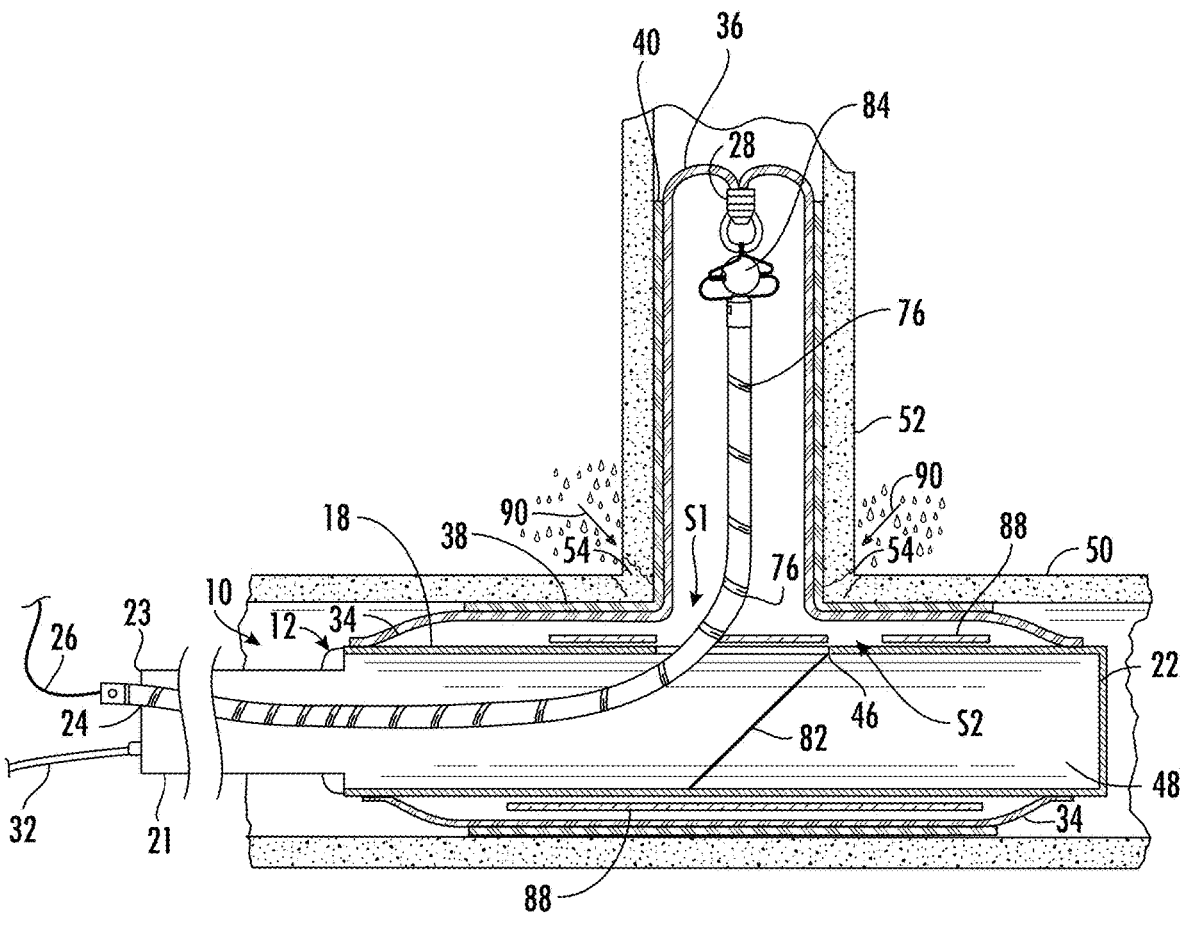
FIG. 6 is a section view of an embodiment of the invention positioned in a pipe system after inversion.

FIGS. 4, 5, and 6 illustrate an embodiment similar to the one described above wherein a lateral liner tube 40, lateral bladder tube 36, and lateral light train 76 are loaded in a launcher device 12. In this embodiment the launcher device 12 has a lay flat hose 21 extension. The lay flat hose 21 is fluidly connected to the first end of the launcher device 12. The opposite end of the lay flat hose 21 is connected to an end cap 23. The lay flat hose 21 provides for the storage, positioning, and application of pressurized fluid for the liner assembly 14, bladder assembly and lighting assembly 87. The lay flat hose 21, end cap 23, and launcher device 12 form a larger launcher device cavity 48 similar to the embodiment described above to allow for a longer lateral liner tube 40, lateral bladder tube 36, and lateral light train 76. The longer components 40, 36, 76 are capable of extending farther into the lateral pipe 52 as shown in FIG. 6. The end cap 23 includes features similar to those described above with respect to end cap 20 shown in FIGS. 1-3. The repair assembly is inverted into the pipe system from a first position shown in FIG. 5 to a second position shown in FIG. 6 in the manner described in the previous embodiment.

Figure 7:
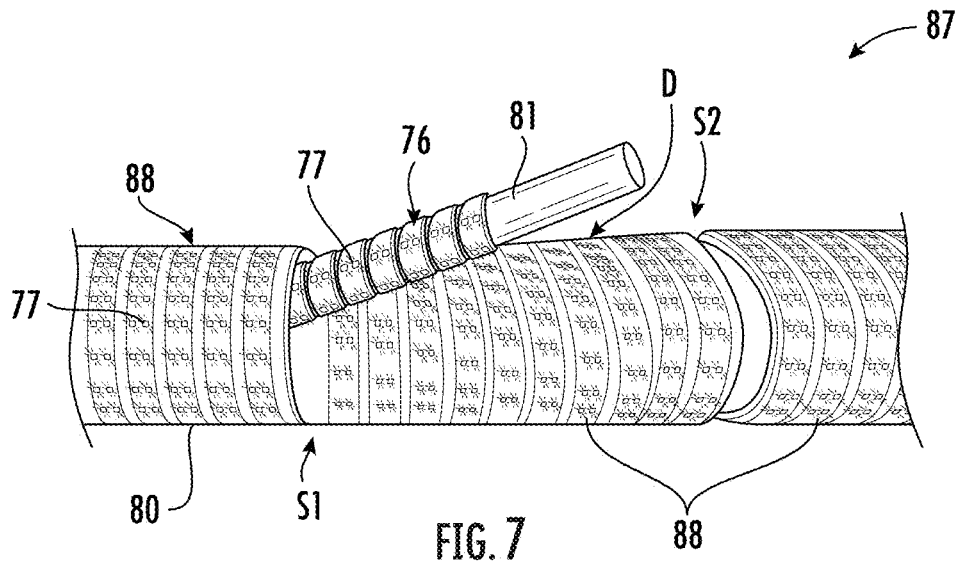
FIG. 7 is a perspective view of an embodiment of the lighting assembly.
Figure 8:
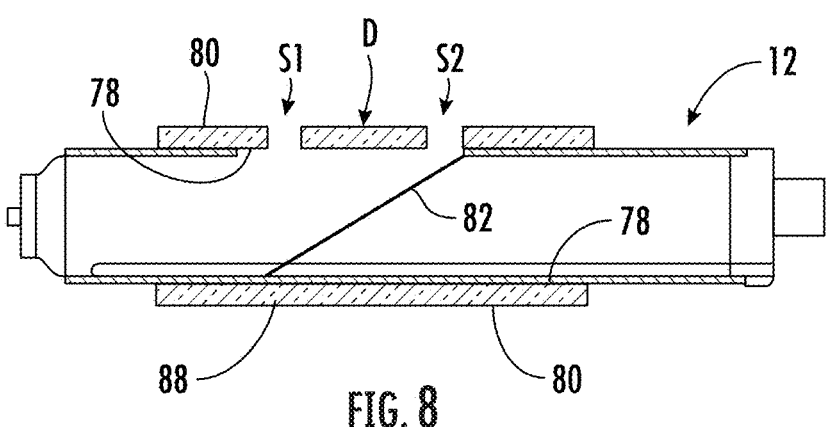
FIG. 8 is a longitudinal section view of the main light pack positioned around a launcher device.
Figures 9, 10A:
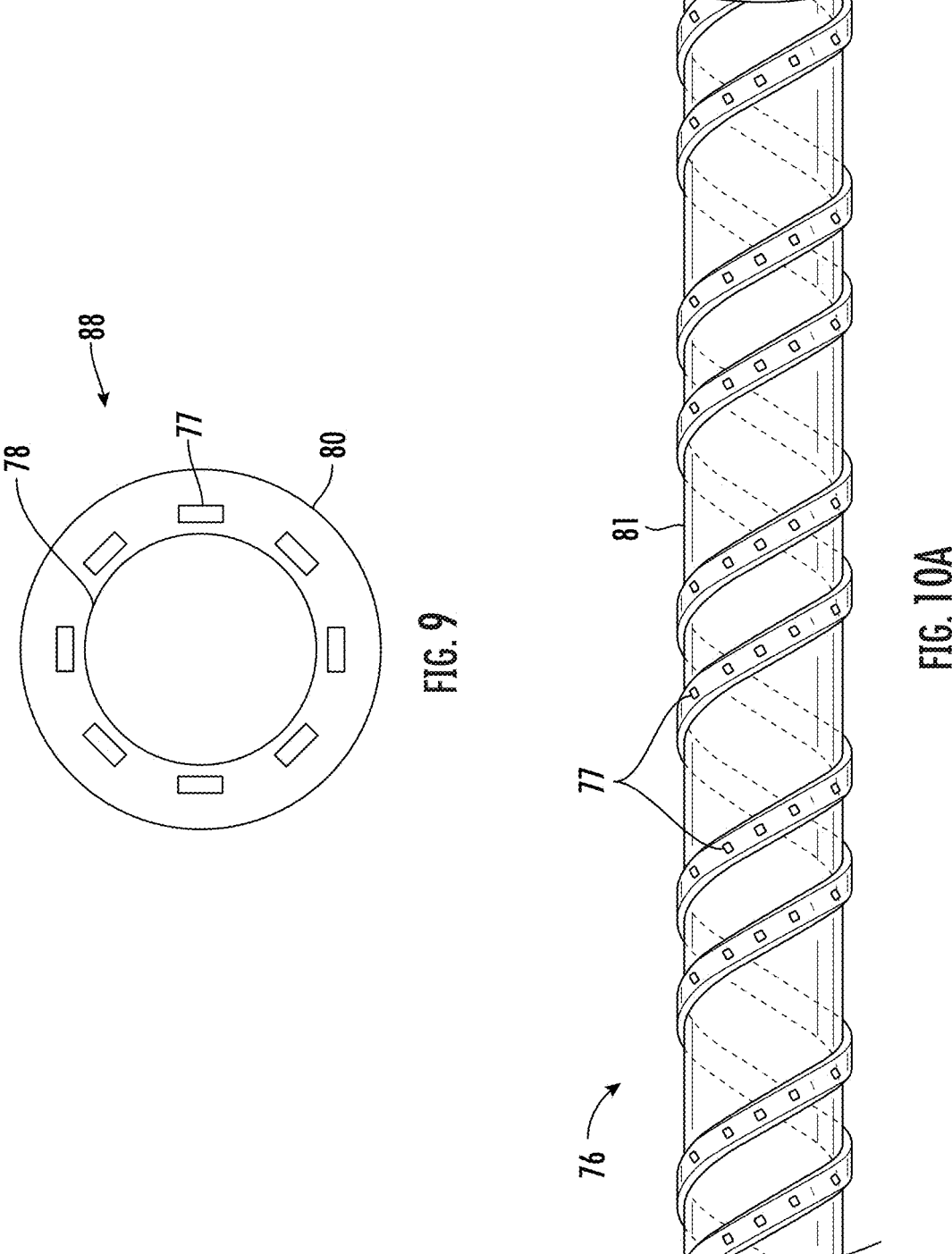
FIG. 9 is a section view of the main light pack.
FIG. 10A is a perspective view of the lateral light train.

FIG. 7-10A show additional details of the lighting assembly 87. FIG. 7 shows an embodiment of the lighting assembly 87 having a main light pack 88 and a lateral lighting train 76 as used in the embodiments described with respect to FIGS. 1-6 (above) and FIGS. 15-16 (below). As described above, the main light pack 88 is configured to be positioned around the launcher device 12 and a leading end of the lateral light train 76 (the end shown in FIG. 7) is configured to be combined with the closed end 28 of the lateral bladder tube 36 (or extension tube 75 as described in alternate embodiments herein which obviate the need for a lateral bladder tube 36). FIG. 9 shows a section view of the main light pack 88 having a plurality of lights 77 positioned around a central opening which is configured to receive the launcher device 12. The lights 77 may be one or more strands of UV-LEDs. In one embodiment the lights 77 are enclosed between two sleeves 78, 80, which may be made from a flexible or elastic material in some embodiments to expand with the expanding bladder tube 36. The outer sleeve 80 is light-permeable so the radiation from the lights 77 can pass through to help cure the light-activated resin impregnated within the main liner member 38. The inner sleeve 78 may also be light-permeable. In some embodiments the inner sleeve 78 is made from a reflective material to help direct the radiation outward toward the main liner member 38. The inner sleeve 78 and outer sleeve 80 may be water impermeable to help protect the electrical components of the main light pack 88 within the wet and sometimes harsh environment of the underground pipe system. In other embodiments the two sleeves 78, 80 are not necessary to enclose and protect the lights 77. For example, the sleeves 78, 80 are not necessary in embodiments where the pipe system is dry or in places where the lights 77 themselves are robust enough to not be negatively affected by the environment of the pipe. A silicone or other light-permeable (e.g., UV transparent or translucent) material may be used to fill the space around the lights 77 and between the two sleeves 78, 80.

In an alternate embodiment the main light pack 88 is positioned within the main bladder tube 34 instead of being a component separate from the main bladder tube 34. In these embodiments the main bladder tube 34 is light-permeable so the radiation from the lights 77 can pass through to help cure the light-activated resin impregnated within the main liner member 38. In these embodiments the main bladder tube 34 looks similar to the main light pack 88 shown in FIG. 9 with the lights 77 positioned between inner and outer sleeves of the bladder. In these embodiments the main light pack 88 is configured to be stretchable or elastic so that it stretches with the expanding bladder tube 34 from a smaller diameter to a larger diameter. The main light pack 88 is biased in the smaller diameter position so that its diameter decreases as the bladder tube 34 is deflated.

Figures 14, 15:
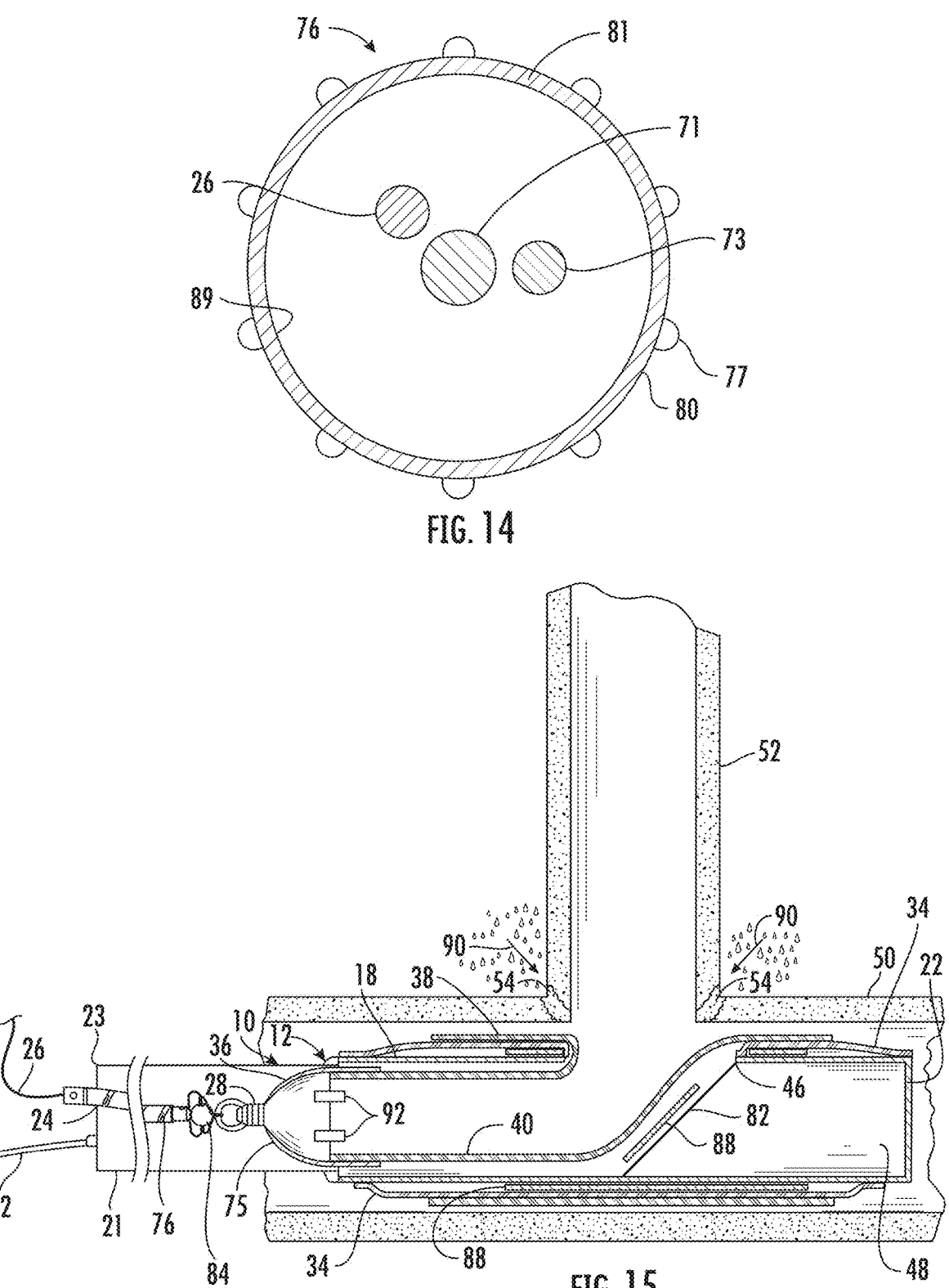
FIG. 14 is a section view of the lateral light train.
FIG. 15 is a section view similar to FIG. 5, but showing an embodiment which obviates the need for a lateral bladder.

As shown in FIGS. 7, 10A, and 14 the lateral light train 76 comprises one or more strands of lights 77 wound around a central core 81, such as a hose. An outer sleeve 80 like the one described above may similarly be used to help protect the lateral light train 76. The lights 77 may be combined with the central core 81 in any suitable configuration. In some embodiments the lights 77 are wound around the core 81 in a multiple helix configuration (e.g., double helix, triple helix, quadruple helix) such that each strand of the helix receives power from a power source in parallel. This configuration allows brighter illumination along the length of the lateral light train 76 with less voltage drop since each helix of lights 77 receives power independently. In other embodiments the lights 77 may be a single strand wound around the core 81 wherein power is periodically provided to the strand through the conducting member 26. Power may be provided periodically (e.g., every few feet) via the conducting member 26 to help ensure the entire length of the light train 76 is properly powered and illuminated. The conducting member 26 may be a power line, heavy gauge flexible wire, or a busbar. The conducting member 26 may provide electrical power to the lateral light train 76 and the main light pack 88 in parallel.

FIG. 14 shows a section view of the lateral light train 76. The lateral light train 76 has an elongated interior opening or lumen 89 configured to enclose one or more elongated components such as wires or ropes. The components are positioned within the lumen 89 radially inward from the lights 77 so the components do not cast a shadow on the liner assembly 14. In one embodiment the conducting member 26 is positioned within the lumen 89. In one embodiment the elongated components include a signal cable 73 such as a camera or video cable is positioned within the lumen 89. In one embodiment the elongated components include a structural component 71 such as a rope or cable which may be made from KEVLAR. The structural component 71 functions as a strain relief mechanism and is designed to withstand the load applied when the lateral light train 76 is being pulled out of the pipe so the load is not applied to other more delicate components, such as the lights 77 or the power cables.

Figure 10B:
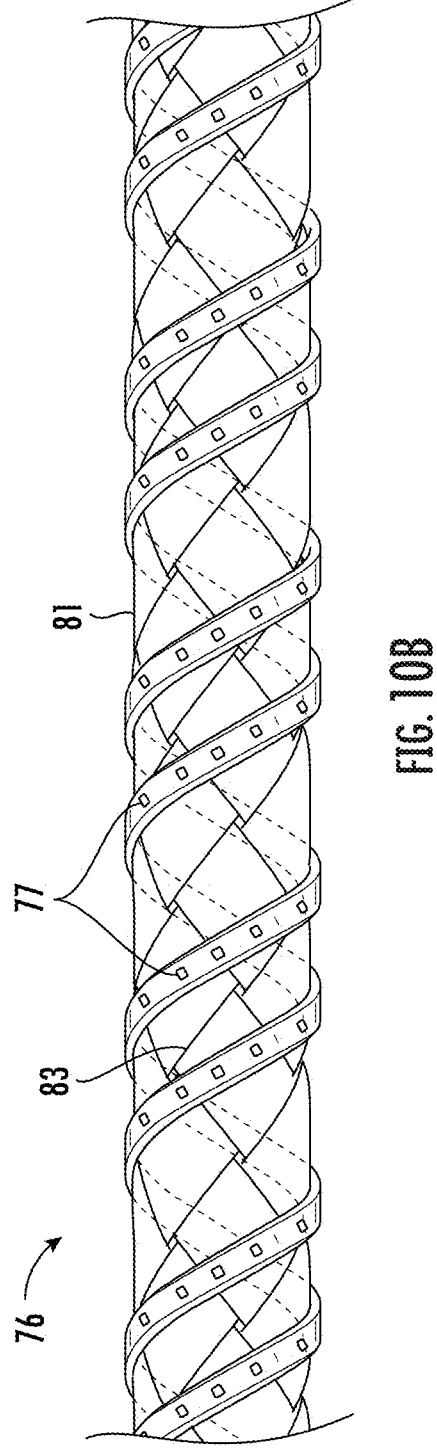
FIG. 10B is a perspective view of an embodiment wherein a woven strain relief mechanism is positioned around the lateral light train.

FIG. 10B shows another embodiment having a different strain relief mechanism. In this embodiment the strain relief mechanism is a woven cuff or sleeve 83 positioned around the central core 81 of the light train 76 with the lights around (on the outside of) the woven sleeve 83. The woven elements may be made of KEVLAR or another suitable material and they may be combined in a cylindrical, helically wound braid that may be a biaxial braid. The woven sleeve 83 functions like a cable grip or Chinese finger trap since pulling along the length of the woven sleeve 83 narrows its circumference, thus tightening the woven sleeve 83 around the central core 81 of the light train 76. In this manner the lateral strain or force is applied to the woven sleeve 83 along the length of the woven sleeve 83 instead of to the light train 76 when pulling the components axially out of the pipeline. The woven sleeve 83 helps grip and pull the lateral light train 76 along its length as the woven sleeve 83 is pulled from the pipe.

The lights 77 may be UV-LEDs, or any other suitable lights 77 having a wavelength which triggers the light-activated initiator(s) embodied in the resin. As explained above, in some embodiments a leading end of the light train 76 is combined with distal (closed) end 28 of the lateral bladder tube 36 so the lateral bladder 36 pulls the light train 76 into the lateral pipe 52. As explained below, in other embodiments the leading end of the light train 76 is combined with a closed extension tube 75 frangibly combined with the distal end of the lateral liner tube 40. The light train 76 may be directly combined with these components or indirectly combined with these components through a d-ring, guide member 84 (explained below), or other suitable connecting means.

The figures show the lighting assembly 87 having one or more slits or openings S1, S2 in the main light pack 88. In the embodiment shown in FIGS. 11 and 12, the openings S1, S2 are in a top portion of the main light pack 88 while the lower portion of the main light pack 88 remains connected. In the embodiment shown in FIG. 7, the openings S1, S2 extend through the entire main light pack 88 effectively separating the light pack 88 into two or more separate sections. Although three separate sections are shown, it should be noted that only two sections are required in some embodiments. The separate sections may by connected electrically to the same power source in series or parallel, or each section may have its own separate power source. In one embodiment the main light pack 88 and the lateral light train 76 are powered from a single power source in parallel.

As shown in FIGS. 2 and 3, the first opening S1 is generally registered with the junction between the lateral pipeline 52 and the main pipeline 50 to allow the inversion components (lateral liner tube 40, lateral bladder tube 36, and lateral light train 76) to invert from the launcher device 12, through the first opening S1 in the main light pack 88, and into the lateral pipeline 52. Some embodiments include a second slit or opening S2 which helps a deformable portion D of the main light pack 88 deform downward to expose the ramp 82 as the leading end of the inversion components slide over the top of the main light pack 88. Other embodiments only include a single slit or opening S1.

FIGS. 11 and 12 show the deformable section D of the main light pack 88 in more detail. As explained in the prior paragraph, the deformable section D is deformed from a first position (FIGS. 3, 6, and 11) to a second position (FIGS. 2, 5, and 12) as the inversion components are being inverted through the first opening S1. The deformable section D is biased in its first position. As the inversion components are inverted out of the first opening S1 and over the top of the deformable section D, the deformable section D compresses downward under the weight of the components to the second position (FIGS. 2, 5, and 12). The inversion components slide over the top of the deformable section D of the main light pack 88 then upward into the lateral pipeline 52. Once inverted into the lateral pipe 52 the inversion components are no longer pressing down on deformable section D, so deformable section D springs back to its first position (FIGS. 3 and 6). In embodiments having the second opening S2, the deformable section D may be compressed downward to expose a portion of the ramp 82 near the second opening S2. This allows the leading end of the inversion components to contact the exposed portion of the ramp 82 to direct them toward the lateral pipe 52 as shown in FIGS. 2 and 5 instead of being directed toward the lateral pipe 52 by contacting the top surface of the deformable section D.

FIG. 13 shows a guide member 84 which may be used in some embodiments to help the leading end of the light train 76 navigate between pipes and around corners. In these embodiments the guide member 84 is combined with the leading end of the lateral light train 76. The guide member 84 includes a member 85 which may be cylindrical or sphere shaped. In some embodiments the member 85 is configured to rotate about an axis that is generally perpendicular to the longitudinal axis A-A of the leading end of the lateral light train 76. In other words, the member 85 rolls over surfaces and around corners as the light train 76 is pulled into position. The guide member 84 may have one or more members 86 extending outwardly along the axis of rotation. The members 86 are configured to contact the inner surface of the pipe to help ensure the member 85 is oriented to rotated about its axis.

Figure 16:
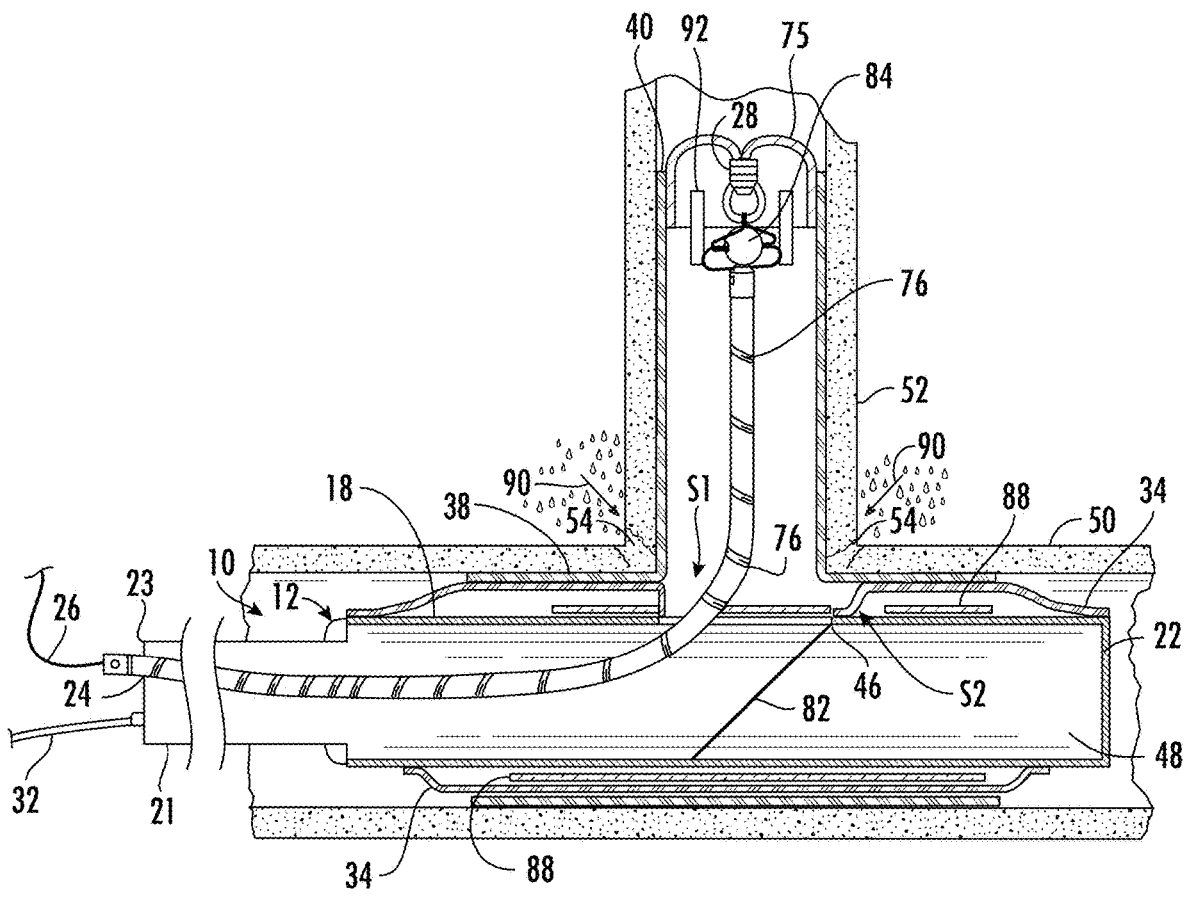
FIG. 16 is a section view similar to FIG. 6, but showing the embodiment of FIG. 15 which obviates the need for a lateral bladder.

FIGS. 15-16 show an alternate embodiment similar to the embodiments described above with respect to FIGS. 1-6 but which obviates the need for a lateral bladder tube 36 to press the lateral liner tube 40 against the lateral pipe 40. In this embodiment the liner material of the lateral liner tube 40 includes first and second opposite wall surfaces. The first wall surface includes a resin absorbent material, such as felt, configured to be impregnated with the curable resin having a light-activated initiator embodied therein. The second wall includes an impermeable layer which prevents air and water to pass through. The impermeable layer may be comprised of a plastic or plastic composite material. As shown, an extension tube 75 is frangibly connected with the distal end of the lateral liner tube 40 as more fully described in U.S. Pat. No. 7,845,372 (Kiest) which is expressly incorporated by this reference. The frangible connection 92 may be glue, VELCRO, or "frangible stitches" which may be torn away by pulling the lateral light train 76. The extension tube 75 may be made of a short length of liner material. In other embodiments the extension tube 75 may be made of a material that does not absorb the resin and become cured, such as rubber, a flexible "lay flat" hose, or a bladder material. The extension tube 75 has a closed end so that positive pressure may be directed into and maintained within the liner assembly 14 causing the main liner member 38 to expand and the lateral liner tube 40 to invert into the lateral pipe 52. After the liner assembly has cured and hardened, the user may retrieve the lateral light train 76 to separate the extension tube 75 from the cured liner at the frangible connection 92 leaving only the cured liner inside the pipe. In this manner the liner is inverted and cured without the need for a lateral bladder tube 36.

Figure 17:
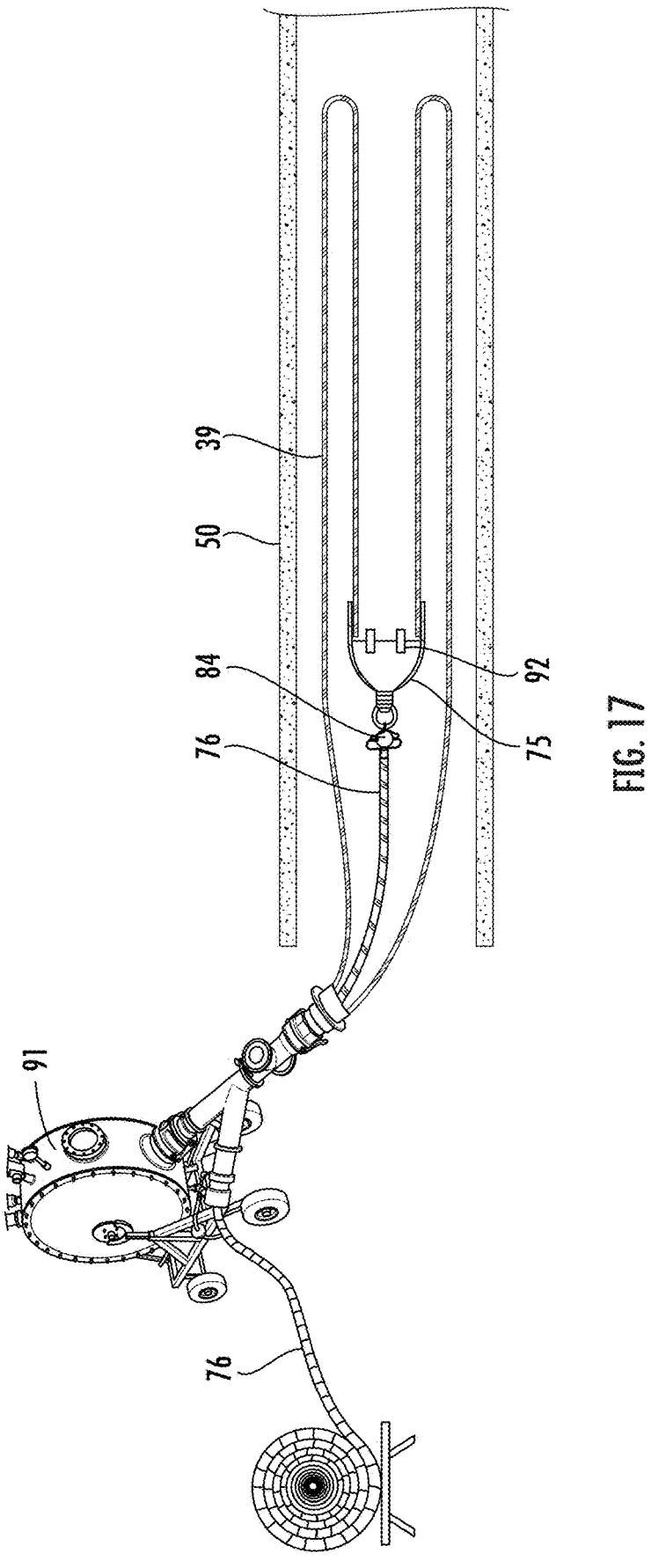
FIG. 17 is a section view of an alternate embodiment which obviates the need for a bladder assembly.

FIG. 17 shows an embodiment which obviates the need for a bladder assembly similar to the one described above, except this embodiment is used in an elongated length of pipe instead of at a pipe junction. In this embodiment a liner 39 (having an impermeable layer as described above) is inverted into a pipe using a pressure drum 91. The trailing end of the liner 39 is frangibly connected to an extension tube 75 as described in the previous embodiment. The light train 76 is combined with the extension tube 75 before the trailing end enters the pipe 52. Once the inversion is complete, pressure is applied to inflate and expand the liner 39 against the interior of the pipe 50 and the light train 76 is activated to initiate curing. In some embodiments the light train 76 may be activated as it is being pulled to the distal end of the liner 39 so that curing begins during the inversion process. After the liner assembly has cured and hardened, the user may retrieve the lateral light train 76 by pulling it to separate the extension tube 75 from the cured liner 39 at the frangible connection 92 leaving only the cured liner 39 inside the pipe 50.

Figure 18:
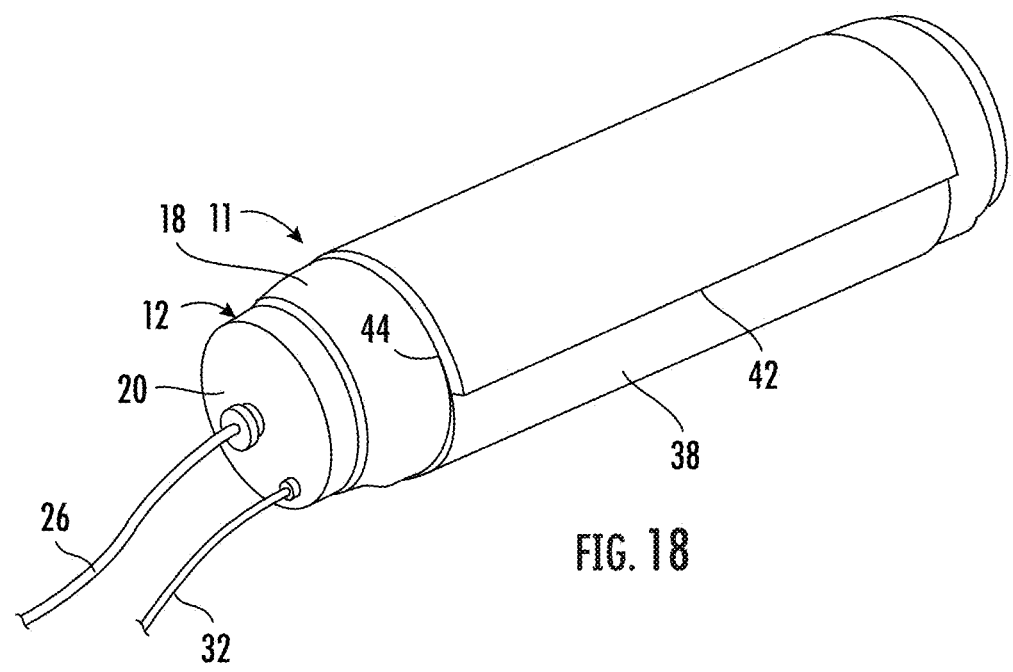
FIG. 18 is a perspective view of an embodiment of the invention configured to spot repair a section of pipe.
Figure 19:
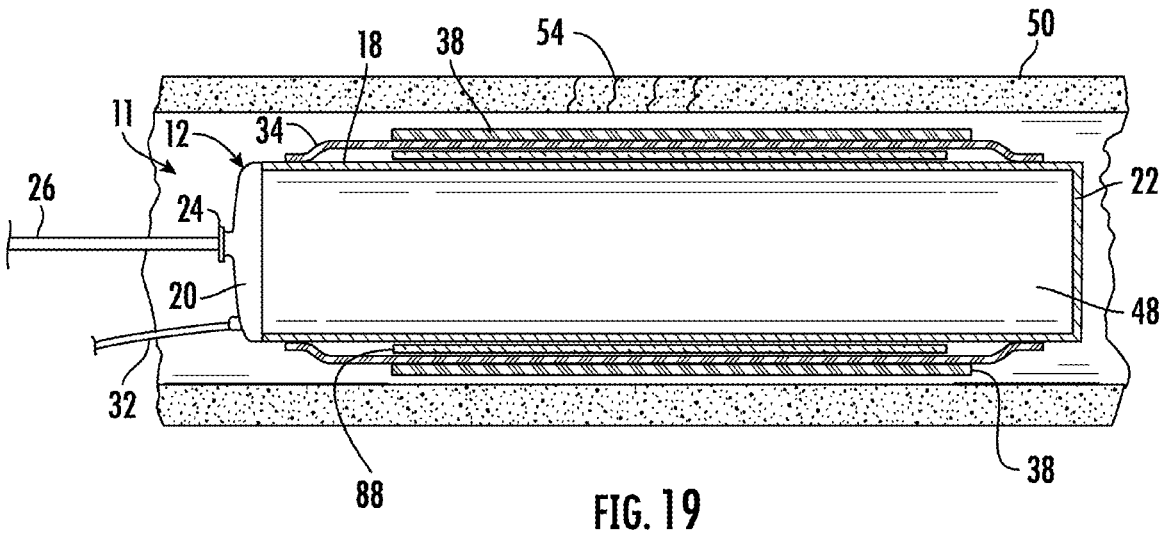
FIG. 19 is a section view of the embodiment of the invention shown in FIG. 18 positioned in a pipe system before inflation.
Figure 20:
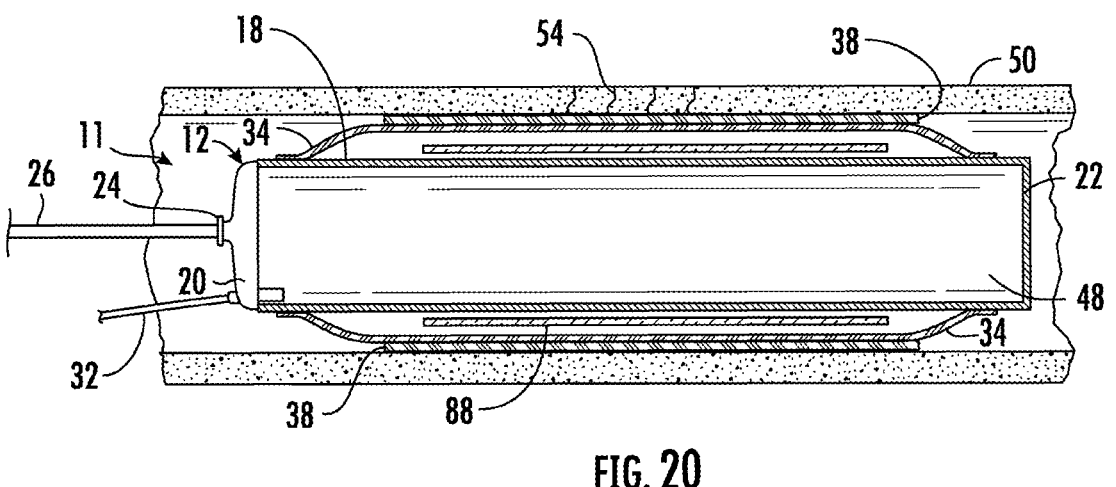
FIG. 20 is a section view of an embodiment of the invention shown in FIG. 18 positioned in a pipe system after inflation.

FIGS. 18-20 show an alternate embodiment for spot repairing a length of pipe. This embodiment includes the components similar to those describe above with respect to FIGS. 1-3 except this embodiment is not used at a pipe junction, so there are no lateral components. More specifically, this embodiment includes a repair assembly generally designated by the numeral 11. Repair assembly 11 includes a launcher device 12, which may be a packer, having mounted thereto a liner member 38, a light pack 88, and a bladder tube 34. The light pack 88 is positioned around the launcher device 12 with the bladder tube 34 radially outward from the light pack 88 and the liner member 38 radially outward from the bladder tube 34 such that the liner member 38 is between the bladder tube 34 and the inside wall of the pipe 50. The launcher device 12 is positioned in a pipe adjacent to a damaged portion 54 needing repair. The liner member 38 is impregnated with a curable resin having one or more light-activated initiators embodied therein. Fluid pressure (such as air pressure) is introduced in the launcher device cavity 48 through air hose 32, which inflates the bladder tube 34 and urges the liner member 38 into contact with the interior walls of the pipeline 50. The light pack 88 is illuminated to cure the resin as explained in other embodiments herein. After the liner member 38 cures and hardens the bladder tube 34 is deflated and removed with the light pack 88 and launcher device 12.

Figure 21:
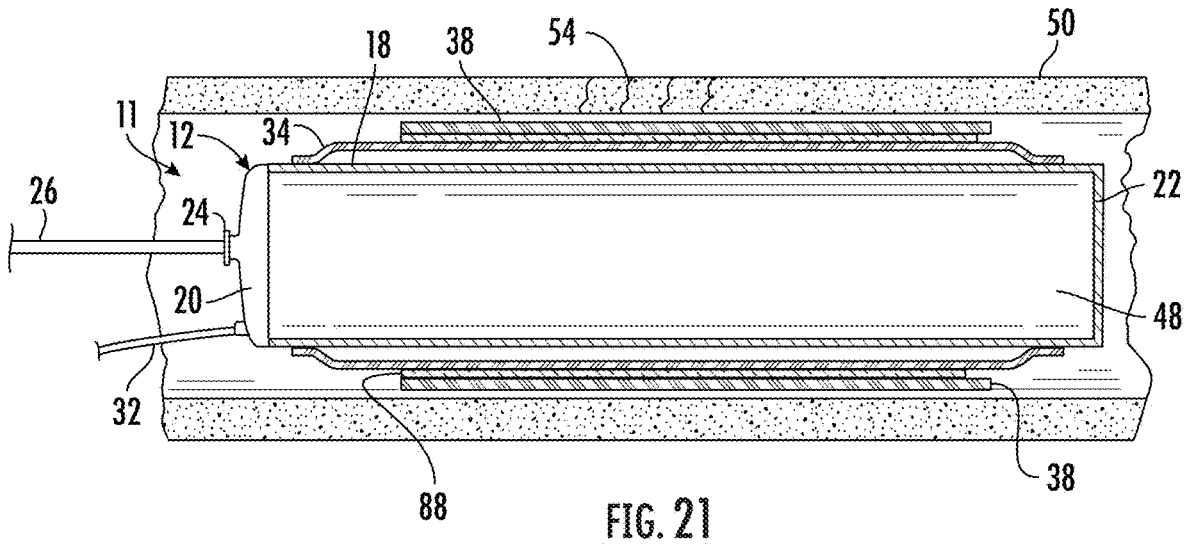
FIG. 21 is a section view similar to FIG. 19 but showing an embodiment wherein the light pack is combined with or radially outward from the bladder tube.
Figure 22:
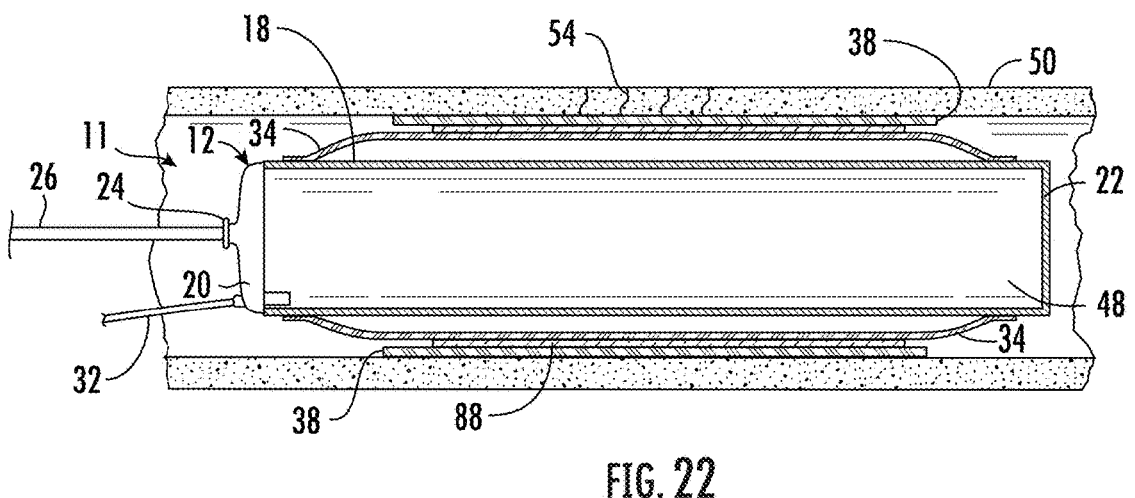
FIG. 22 is a section view similar to FIG. 20 but showing the embodiment of FIG. 21.

FIGS. 21-22 show an alternate embodiment for spot repairing a length of pipe. This embodiment includes the components similar to those describe above with respect to FIGS. 18-20. This embodiment includes a repair assembly generally designated by the numeral 11. Repair assembly 11 includes a launcher device 12, which may be a packer, having mounted thereto a liner member 38, a light pack 88, and a bladder tube 34. The bladder tube 34 is positioned around the launcher device 12 with the light pack 88 radially outward from the bladder tube 34 and the liner member 38 radially outward from the light pack 88 such that the liner member 38 is between the light pack 88 and the inside wall of the pipe 50. In some embodiments the light pack 88 is within or part of the bladder tube 34 so that they are effectively a single component. The light pack 88 is configured to be stretchable or elastic so that it stretches with the expanding bladder tube 34 between a first position having a first (smaller) diameter and a second position having second (larger) diameter. The light pack 88 is biased in the smaller diameter position so that its diameter decreases as the bladder tube 34 is deflated. The launcher device 12 is positioned in a pipe adjacent to a damaged portion 54 needing repair. The liner member 38 is impregnated with a curable resin having one or more light-activated initiators embodied therein. Fluid pressure (such as air pressure) is introduced in the launcher device cavity 48 through air hose 32, which inflates the bladder tube 34 and urges the light pack 88 to expand outwardly and the liner member 38 into contact with the interior walls of the pipeline 50. The light pack 88 is illuminated to cure the resin as explained in other embodiments herein. After the liner member 38 cures and hardens the bladder tube 34 is deflated and removed with the light pack 88 and launcher device 12.

The embodiments disclosed herein may be used with one or more hydrophilic or hydrophobic bands or gaskets as disclosed in U.S. Pat. Nos. 6,994,118 and 7,975,726, which are hereby expressly incorporated by this reference. It should also be noted that any reference to a "main" pipe or "lateral" pipe should be understood to mean a "first" pipe and "second" pipe, respectively, since embodiments of the invention may be used in different types and sizes of pipes.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. An apparatus for repairing a main pipeline and a lateral pipeline connected thereto and in communication therewith to form a pipe juncture, the apparatus comprising:

a liner assembly having a main liner member and a lateral liner tube of resin absorbent material in communication with one another through a liner juncture;

a bladder assembly having a main bladder tube and a lateral bladder tube in communication with one another through a bladder juncture;

a lighting assembly having a main light pack and a lateral light train, the main light pack having an outer surface defining a circumference and a first strand of lights wound around a central opening that is configured to receive a launcher device, and the lateral light train having a second strand of lights wound around a central core;

wherein the main light pack has a first opening and a second opening spaced from the first opening, the first opening and the second opening are in the outer surface around a portion of the circumference such that the main light pack has a deformable section between the first opening and the second opening;

wherein the lateral bladder tube, the lateral liner tube, and the lateral light train are configured to extend within the lateral pipeline with the lateral light train being inside the lateral bladder tube, the lateral bladder tube being inside the lateral liner tube, and the lateral liner tube being between the lateral pipeline and the lateral bladder tube;

wherein the main bladder tube, the main liner member, and the main light pack are configured to extend within the main pipeline.

2. The apparatus of claim 1 wherein the main liner member is formed as a tube.

3. The apparatus of claim 1 wherein the lateral light train has a leading end and the lateral bladder tube has a closed end, and the leading end of the lateral light train is combined with the closed end of the lateral bladder tube.

4. The apparatus of claim 3 further comprising a spherical guide member combined with the leading end of the lateral light train, the spherical guide member also combined with the closed end of the lateral bladder tube.

5. The apparatus of claim 1, further comprising a launcher device having a launcher device cavity, wherein the lateral liner tube, the lateral bladder tube, and the lateral light train are configured to pass through the first opening of the main light pack as they are moved from the launcher device into the lateral pipeline.

6. The apparatus of claim 5 wherein the deformable section between the first opening and the second opening is configured to deform downward from a first position to a second position to expose a ramp positioned within the launcher device.

7. The apparatus of claim 6 wherein the deformable section is biased in the first position.

8. The apparatus of claim 1 wherein the first strand of lights is enclosed between an inner sleeve and an outer sleeve, wherein the outer sleeve is light-permeable.

9. The apparatus of claim 1 wherein the main bladder tube is light-permeable and configured to expand under fluid pressure to press the main liner member against the main pipeline.

10. The apparatus of claim 1 wherein the lateral bladder tube is light-permeable and configured to expand under fluid pressure to press the lateral liner tube against the lateral pipeline.

11. The apparatus of claim 1 wherein the main light pack and the lateral light train are configured to receive electrical power in parallel from a power source.

12. The apparatus of claim 1 wherein the central core has a lumen therein configured to receive one or more elongated components.

13. The apparatus of claim 12 wherein one of the one or more elongated components is a structural component configured to serve as a strain relief mechanism when the lateral light train is pulled from one end.

14. The apparatus of claim 12 wherein one of the one or more elongated components is an electrical power cable configured to supply power to the lateral light train.

15. The apparatus of claim 12 further comprising a conducting member configured to distribute power along a length of the second strand of lights.

16. The apparatus of claim 12 wherein the second strand of lights are UV-LEDs.

17. The apparatus of claim 12 wherein the lateral light train includes a third strand of lights wrapped around the central core, the second strand of lights and the third strand of lights configured to receive electrical power from a power source in parallel.

18. The apparatus of claim 1 wherein the main bladder tube and the lateral bladder tube are configured to allow a first wavelength of light to pass through but not a second wavelength of light to pass through.

19. The apparatus of claim 18 wherein the first wavelength of light is in the ultraviolet range and the second wavelength of light is in the visible range.

20. The apparatus of claim 1 wherein the lighting assembly is configured to emit a first wavelength of light and a second wavelength of light.

21. The apparatus of claim 1 wherein the liner assembly is impregnated with a resin having a first light-activated initiator configured to initiate curing the resin at a first wavelength and a second light-activated initiator configured to initiate curing the resin at a second wavelength.

22. The apparatus of claim 1 wherein the main light pack is positioned inside the main bladder tube and the main liner member is positioned between the main pipeline and the main bladder tube.

23. An apparatus for repairing a main pipeline and a lateral pipeline connected thereto and in communication therewith to form a pipe juncture, the apparatus comprising:

a liner assembly having a main liner member and a lateral liner tube of resin absorbent material in communication with one another through a liner juncture;

a bladder assembly having a main bladder tube and a lateral bladder tube in communication with one another through a bladder juncture;

a lighting assembly having a main light pack and a lateral light train;

wherein the lateral bladder tube, the lateral liner tube, and the lateral light train are configured to extend within the lateral pipeline with the lateral light train being inside the lateral bladder tube, the lateral bladder tube being inside the lateral liner tube, and the lateral liner tube being between the lateral pipeline and the lateral bladder tube;

wherein the main bladder tube, the main liner member, and the main light pack are configured to extend within the main pipeline;

a launcher device having a launcher device cavity, the main light pack at least partially surrounding the launcher device;

wherein the main light pack has a first opening and the lateral liner tube, the lateral bladder tube, and the lateral light train are configured to pass through the first opening as they are moved from the launcher device into the lateral pipeline;

wherein the main light pack has a second opening spaced from the first opening, and wherein the main light pack has a deformable section between the first opening and the second opening configured to deform downward from a first position to a second position to expose a ramp positioned within the launcher device.

24. An apparatus for repairing a main pipeline and a lateral pipeline connected thereto and in communication therewith to form a pipe juncture, the apparatus comprising:

a liner assembly having a main liner member and a lateral liner tube of resin absorbent material in communication with one another through a liner juncture;

a bladder assembly having a main bladder tube and a lateral bladder tube in communication with one another through a bladder juncture;

a lighting assembly having a main light pack and a lateral light train, the lateral light train configured to be inserted into the lateral pipeline;

a cavity configured to contain at least a portion of the lateral liner tube, the lateral bladder tube, and the lateral light train prior to extension into the lateral pipeline;

wherein the main light pack has a first opening and a second opening spaced from the first opening, such that the main light pack has a deformable section between the first opening and the second opening configured to deform downward from a first position to a second position and wherein the lateral liner tube, the lateral bladder tube, and the lateral light train are configured to pass through the first opening as they are moved from the cavity and extended into the lateral pipeline, with the lateral light train being inside the lateral bladder tube, the lateral bladder tube being inside the lateral liner tube, and the lateral liner tube being between the lateral pipeline and the lateral bladder tube;

wherein the main bladder tube, the main liner member, and the main light pack are configured to extend within the main pipeline;

wherein the main light pack and the lateral light train are configured to receive electrical power in parallel from a power source;

wherein the lateral light train includes a first strand of lights wrapped around a central core, the central core having a lumen therein configured to receive one or more elongated components;

wherein one of the one or more elongated components is one of an electrical power cable configured to supply power to the lateral light train or a structural component configured to serve as a strain relief mechanism when the lateral light train is pulled from one end.

* * * * *